Aug. 22, 1961  D. W. JEFFRIES  2,996,886
SELF-ADJUSTING BRAKE OR CLUTCH MECHANISM
Filed March 24, 1958  4 Sheets-Sheet 1
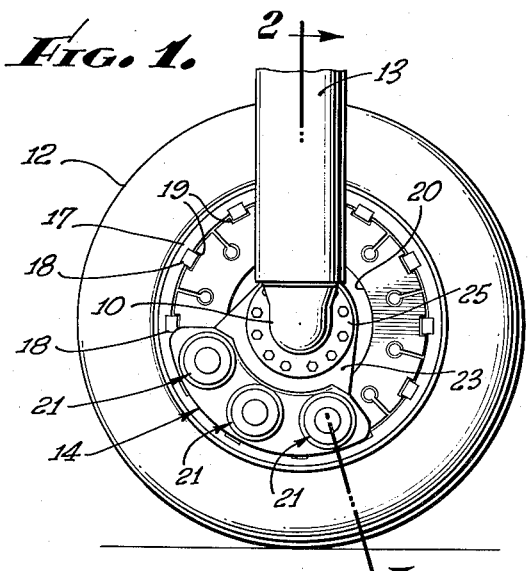
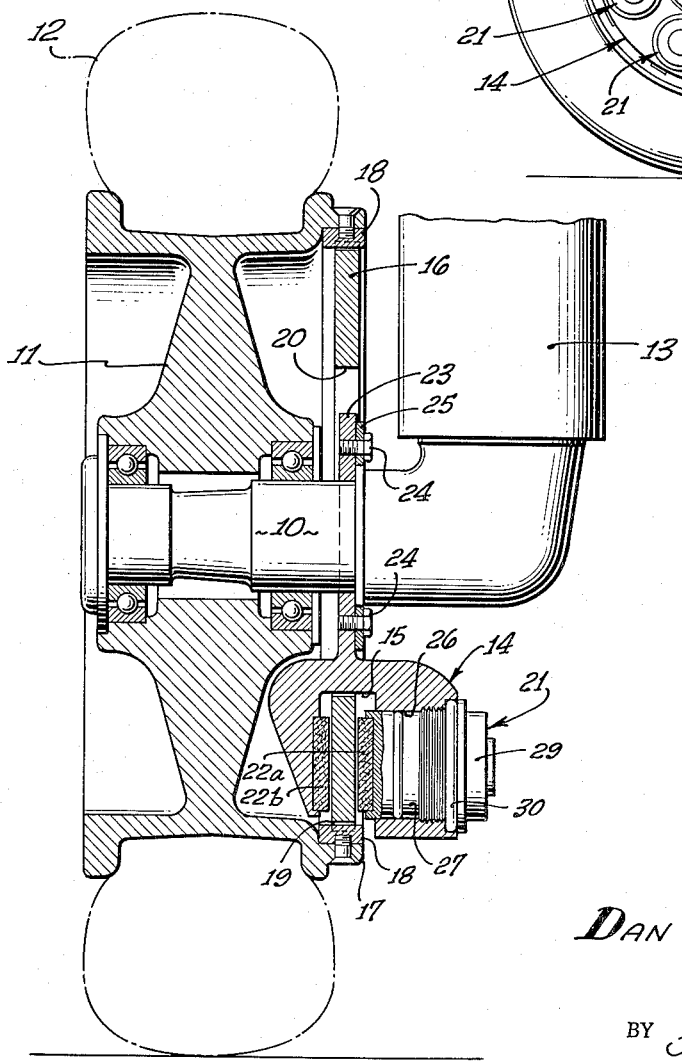
DAN W. JEFFRIES
INVENTOR.
BY
ATTORNEYS.

Aug. 22, 1961   D. W. JEFFRIES   2,996,886
SELF-ADJUSTING BRAKE OR CLUTCH MECHANISM
Filed March 24, 1958   4 Sheets-Sheet 2

Dan W. Jeffries
INVENTOR.

BY Flam and Flam
ATTORNEYS.

Aug. 22, 1961  D. W. JEFFRIES  2,996,886
SELF-ADJUSTING BRAKE OR CLUTCH MECHANISM
Filed March 24, 1958  4 Sheets-Sheet 4
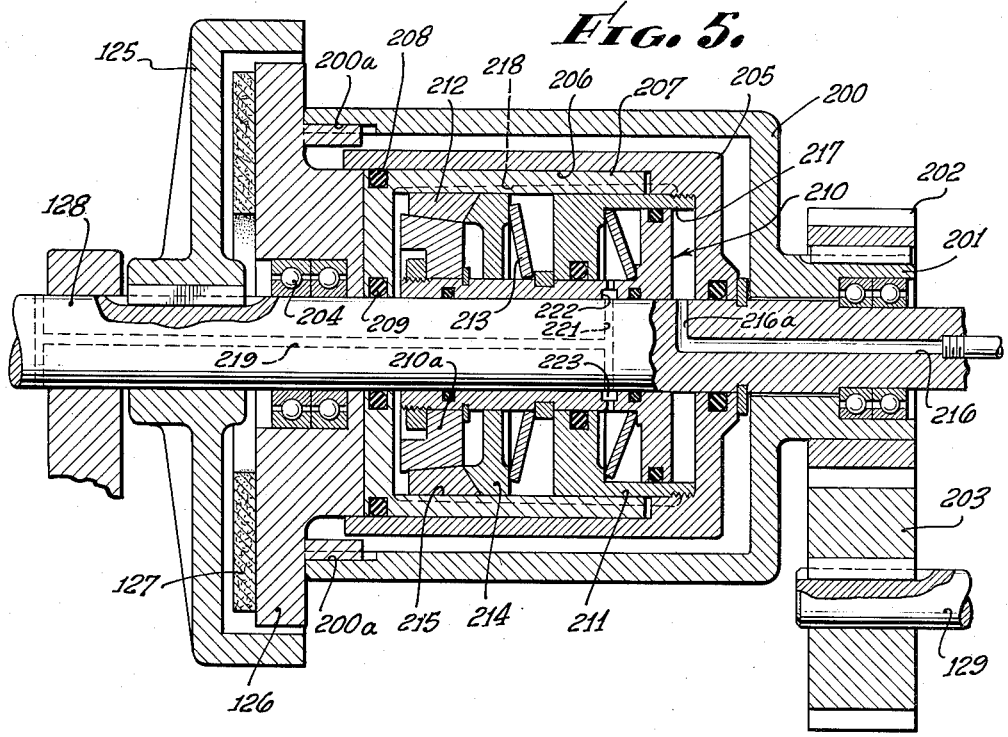
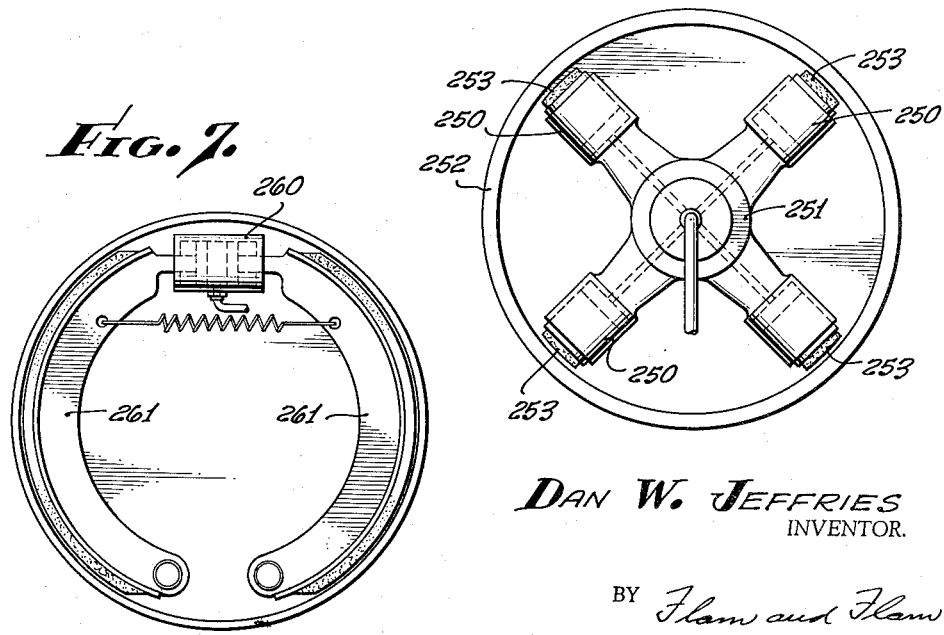
DAN W. JEFFRIES
INVENTOR.
BY *Flam and Flam*
ATTORNEYS.

2,996,886
SELF-ADJUSTING BRAKE OR CLUTCH MECHANISM
Dan W. Jeffries, Los Angeles, Calif., assignor of one-half to Garal Mfg. Corp., doing business as Nash Engineering Co., Lynwood, Calif., a corporation of California
Filed Mar. 24, 1958, Ser. No. 723,495
7 Claims. (Cl. 60—54.6)

This invention relates to a hydraulic actuating cylinder structure for brakes, clutches, hydraulic rams or the like. Particularly the invention relates to an actuating structure which advances as required and which retracts to provide pre-set clearance.

In aircraft applications, space for actuating cylinders is limited. It is crucial that the maximum braking power be achieved for a given cylinder space because safely and quickly stopping an airplane has become of increasing importance in view of the type of pay loads carried. In the past, an automatic adjustment mechanism has detracted from the available effective cylinder area, with a consequent reduction in efficiency. The primary object of this invention is to provide an actuating cylinder of the self-adjusting type which does not detract from the efficiency of braking. To accomplish this purpose, novel use is made of a supplemental piston that achieves the retracting function. The main piston is not utilized to provide the potential energy stored in the retracting mechanism. Hence, the work of the main piston is utilized entirely for the braking functions.

In brake systems, there is a lost motion between the piston and the work. Desirably the amount of lost motion is maintained at a precise value. Heat expansion during application results in the elimination, to a substantial degree, of the desired lost motion. This may result in dragging brakes. It is vital to provide a mechanism that compensates during application for heat as well as for wear, the latter factor normally tending to increase the amount of lost motion. This contrasts with prior structures which require a subsequent application of the brakes to perform the complete adjusting functions.

Desirably the resetting or compensating function of the retracting mechanism is accomplished for any braking application, light as well as heavy. An object of this invention is to provide a structure which resets at a very low value. This ensures that the brakes will be free, for example, after light brake applications during taxying prior to takeoff.

A low value for resetting is made possible by the supplemental piston and its structural relationship to the remaining parts of the apparatus.

Another object of this invention is to provide a compensating actuating cylinder which does not overtravel and which produces desired clearance independently of the maximum pressure attained during operation.

Another object of this invention is to provide an improved clutch or brake actuating unit that is simple in construction and, hence, reliable and economical from the standpoint both of manufacture and maintenance.

Another object of this invention is to provide a novel arrangement of brake or clutch cylinders whereby centrifugal force acts to assist in the actuation.

This invention possesses many other advantages, and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

FIGURE 1 is a side elevation of a wheel hub incorporating the invention, and illustrating the position of brake cylinders;

FIG. 2 is an enlarged sectional view, taken along the plane indicated by line 2—2 of FIG. 1;

FIG. 5 is a longitudinal sectional view of a clutch unit embodying the present invention;

FIG. 6 is a diagrammatic view illustrating an alternate orientation of brake cylinders; and FIG. 7 diagrammatically illustrates brake cylinders incorporating the present invention used with a typical automobile brake.

Figure 3:
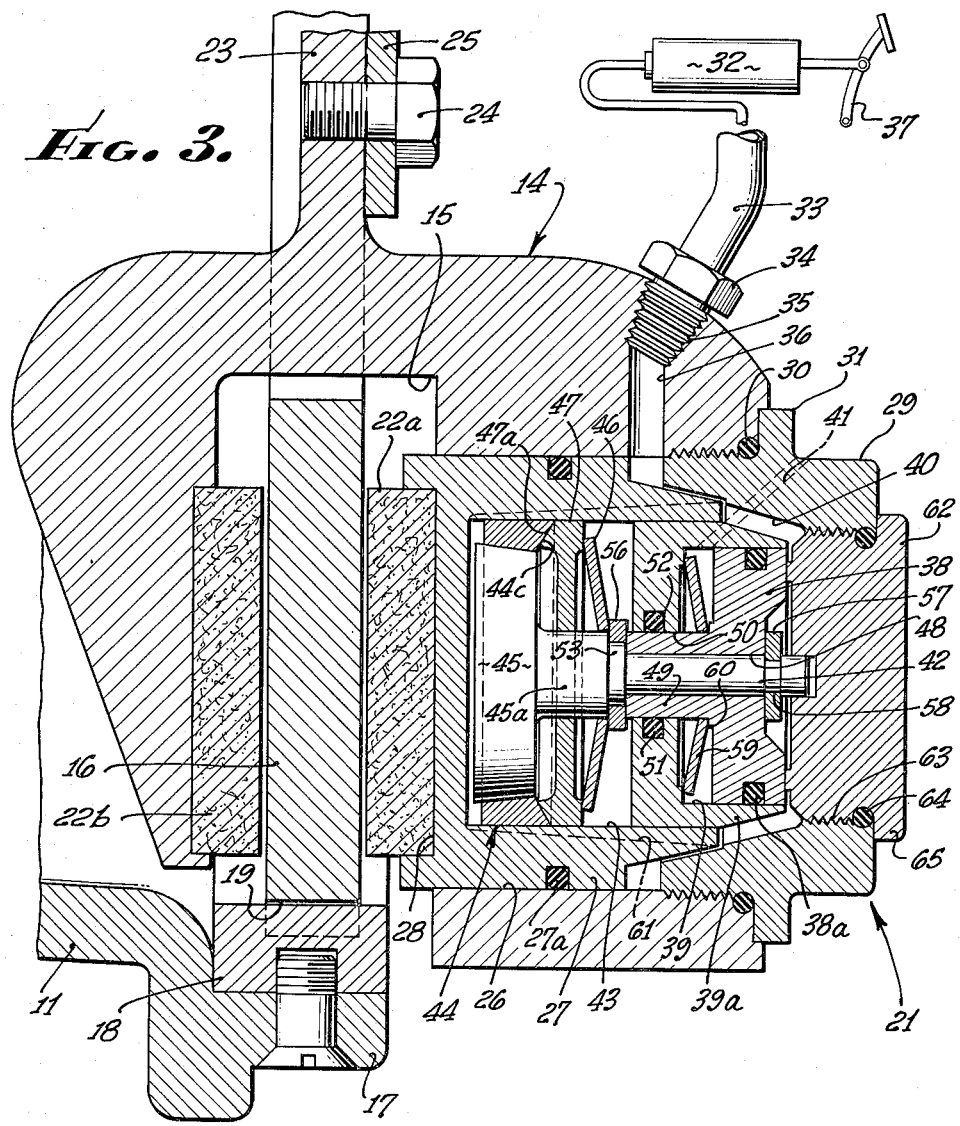
FIG. 3 is a further enlarged fragmentary sectional view illustrating the details of a brake cylinder incorporating the present invention.

In FIGS. 1 and 2, there is disclosed an axle 10 upon which a wheel hub 11 and a tire 12 are rotatably mounted. The axle 10 connects with a strut 13 of an airplane landing wheel structure or the like.

The axle 10 carries a brake anvil 14 upon which three brake units 21 are mounted. The anvil 14 extends arcuately about the lower segment of the hub 11, as illustrated clearly in FIG. 1. It provides an outwardly opening arcuate recess or groove 15 into which a rotatable brake disk 16 projects. For this purpose, the hub 11 has a flange 17 mounting a series of keys 18 (see also FIG. 1). The brake disk 16 has a series of angularly spaced slots 19 in the periphery of disk 16 and in which the keys 18 are received. Accordingly, the brake disk 16 is rotatable with the hub 11, but it is free to move axially. The brake disk 16 has a central opening 20 through which the axle 10 passes with substantial clearance.

The three brake units 21 (FIG. 1) are located angularly and in spaced relationship along the outer arm of the anvil. Each of these units has an axially movable member to provide a braking force. The unit 21, as viewed in FIG. 2, mounts a friction disk 22a which is moved inwardly of the anvil for engagement with the brake disk 16. A companion backing friction disk 22b, fastened to the left-hand wall of groove or recess 15 on the opposite side of the brake disk 16, provides a surface on the opposite side of the disk 16 against which the disk 16 is urged.

For mounting purposes, the anvil 14 has a central mounting flange 23 secured as by a series of cap screws 24 to a flange 25 provided on the axle 10.

The brake unit 21 is shown in detail in FIG. 3. The anvil 14 provides three bores 26 extending from that arm of the anvil remote from the hub 11 inwardly to the anvil recess 15. Movable pistons 27 are mounted in these bores 26. All three are alike, and only one will be described in detail.

The piston 27 has at its left-hand surface a shallow recess 28 within which the friction disk 22a is received and maintained. A cap 29 is threadedly received within the outer end of the anvil bore 26 to seal the space provided by the bore. An O-ring 30, mounted at the base of the peripheral threads of the cap and adjoining a peripheral flange 31, is urged into engagement with the edge about the anvil bore 26.

Fluid from a master cylinder structure 32 is conducted to the right-hand side of the piston 27 by the aid of a conduit 33. The conduit 33 carries a fitting 34 at its end, detachably cooperating with a taper threaded aperture 35 of the anvil 14. A passage 36 establishes communication between the conduit 33 and the anvil bore 26. Upon actuation of the master cylinder 32, as by a footpedal 37, pressure is supplied to the right-hand side of the pistin 27, and it accordingly moves to the left so that the friction disk 22a carried thereby engages the brake disk 16. Piston 27 has an O-ring 27a in its periphery to maintain a seal around the piston.

In order to retract the main piston 27, a supplemental piston 38 is provided. The piston 38 is slidable in an outwardly facing cylinder space or recess 39 provided in a central boss 39a formed inwardly of the cap 29. An O-ring 38a in the periphery of the piston 38 maintains a seal around the piston. The piston 38 moves to the left, as does the main piston 27, upon the application of fluid pressure. For conducting fluid pressure, the cap 29 has one or more oblique ports 40 which are, at their left-hand ends, in constant communication with the main chamber. Their right-hand ends are in constant communication with the outer or right-hand portion of the supplemental piston 38. The piston 38 has a reduced extension 49 passing through a central opening 50 in the bottom of the cap recess 39.

A vent hole 41, which passes between the pressure ports 40, communicates the cylinder space 39 to the external atmosphere. Alternately a chamber of signnificant volume, as compared to the displacement of the supplemental piston, can be provided. An O-ring 51, accommodated in an internal groove 52 at the opening 50, seals the low pressure side of the piston 38. Accordingly, on the application of fluid pressure, the supplemental piston 38 moves to the left.

The inward extension 39a of the cap 29 which provides the recess 39 serves also as a guide for the main piston 27. For this purpose, the main piston 27 telescopes rearwardly with clearance over this extension.

A plug 62 in the cap 29 facilitates assembly of the supplemental piston 38 thereto. The plug 62 has a peripherally threaded portion cooperable with an interiorly threaded opening 63 of the cap 29. An O-ring 64, accommodated at the base of a flange 65 of the plug 62, engages the edges about the outer opening of the cap opening 63 to ensure the desired seal. The plug 62 determines the retracted position of the supplemental piston 38.

The energy for retracting the main piston and supplemental piston is derived from a spring washer 59 which is interposed between the bottom of the cylinder provided by the cap recess 39 and the interior surface of the supplemental piston. The spring washer 59 fits the extension 49 of the supplemental piston. The inner aperture of the spring washer 59 engages the narrow raised seat 60 formed on the interior surface of the supplemental piston 38 at the base of the extension 49. The spring washer 59 is compresesd to store energy during advancement of the supplemental piston 38.

The supplemental piston 38, retracted by the spring washer 59, in turn retracts the main piston 27. For this purpose, a yielding friction connection is provided between the supplemental and the main piston 27. A head 45 extends with clearance within a rearwardly facing recess 43 provided within the main piston 27. The head has a hub 45a, a short first reduced extension 53 and a second elongate reduced extension forming a stem 42. The stem 42 projects entirely through a through bore 48 in the supplemental piston 38. A snap ring 57, in a groove 58 at the projecting end of the stem, holds the head 45 against movement to the left relative to the supplemental piston 38.

Figure 3A:
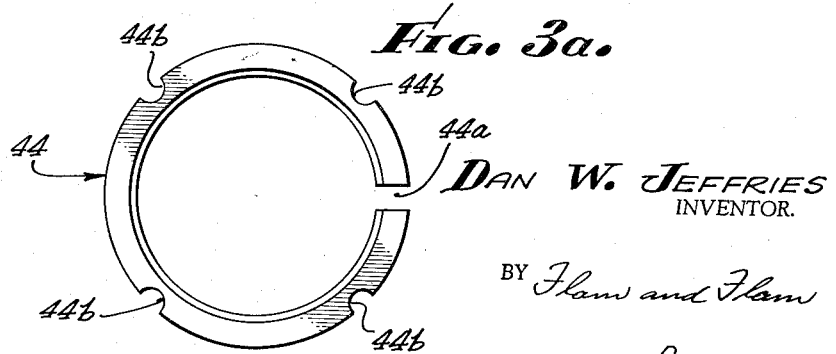
FIG. 3a is a plan view of a gripper ring forming a part of the structure illustrated in FIG. 3.

An expansible gripper ring 44 (see also FIG. 3a) is confined between a substantially cylindrical inner wall of the main piston recess 43 and a frusto-conical exterior surface of the head 45. The gripper ring 44 has an interior surface frusto-conically formed in order to fit the head 45. A stiff spring washer 46, acting upon a pressure ring 47, urges the gripper ring 44 longitudinally to the left along the head 45. The pitch of the surfaces of the conical head 45 and the gripper ring 44 is such that this movement of the spring ring 44 causes it to expand and to engage frictionally the inner wall of the main piston recess 43. To permit this expansion, the gripper ring 44 is split, as at 44a (FIG. 3a), and it is provided with a series of recesses 44b to provide a low bending moment of the spring ring 44.

The pressure ring 47 has a conical surface 47a engaging a companion conical end surface 44c of the gripper ring 44. Accordingly, the pressure ring 47 supplements the action of the head 45 in urging the gripper ring 44 outwardly and into frictional contact with the main piston recess 43.

Oblique slots 61, formed annularly about the interior surface of the main piston recess 43, serve to establish communication between the inlet passage 36 and the interior area of the piston 27 at the recess 43. The angularity of the recesses 61 also facilitates bleeding of air upon initial insertion of fluid into the lines.

The pressure ring 47 and the spring washer 46 have central apertures by the aid of which they are mounted upon the hub 45a of the head 45.

A ring 56 forms a seat for the spring washer 46, the inner aperture of the spring 46 engaging the projecting portion of the ring 56.

The limit of left-hand movement of the supplemental piston 38 is determined by the position of the bottom of the cap recess 39 and the dimensions of the spring washer 59.

When the brakes are applied by operation of pedal 37, the main piston 27 and the supplemental piston 38 will have reached their respective limits of movement, as determined respectively by engagement of the friction material 22 with the brake disk 16, and the supplemental piston 38 with the bottom of the cap recess 39.

As the parts deflect during application of the brakes, the main piston 27 advances relative to the supplemental piston 38, the supplemental piston being separately limited in its travel. During application, heat expansion causes relative retraction of the main piston 27. Wear during application causes relative advancement. All these factors determine the relative position of the two pistons, there being slippage at the gripper ring 44.

When the pressure is released from a high value, a final relative position between the pistons is reached at a pressure, say 200 lbs. per square inch, corresponding to that necessary to overpower the spring washer 59 and the frictional forces at the gripper ring 44.

When the piston pressure is further reduced to a point where the spring washer can overpower the pressure of both pistons, say at 30 lbs. per square inch, the pistons begin to retract in unison to establish the required preset clearance. The friction force at the gripper ring 44, say 300 lb., must be greater than the net force of the spring washer 59 to ensure retracting movement.

The relative positions of the pistons are entirely independent of the maximum pressure. Hence, a reliable yet small retracting movement to provide sufficient clearance is achieved. Excessive retracting movement, which would require substantial fluid displacement, is completely avoided.

The friction coupling between the pistons is readily overcome to provide additional clearance if required, that is, when the supplemental piston advances relative to the main piston. Desirably the frictional force at the gripper ring 44 to be overcome for relative movement in this direction is much less than that for opposite movement so that proper positioning for subsequent retracting movement is accomplished at relatively low pressure.

The provision of potential energy for the retracting washer 49 is entirely independent of the main piston 27. Hence, the main piston 27 is utilized entirely for the braking function.

When the fluid pressure is entirely released by release of pedal 37, the supplemental piston is withdrawn an amount determined by engagement with the plug 62 or other suitable stop. By controlling the dimensions of the spring 59 and its limit of movement, a definite and predetermined retraction movement of the main piston 27 is achieved.

When the brakes are reapplied without appreciable cooling, the main piston 27 and supplemental piston 38 act in unison, there being in this instance no relative movement between the friction ring and the main piston 27. Efficient and reliable operation is ensured.

When new facing material 22 is provided or when a new brake disk 16 is inserted or the like and the brakes are then applied, the main piston 27 will reach its limit of movement prior to the time that the supplemental piston 38 reaches its limit of movement. Hence, the supplemental piston 38 advances relative to the main piston 27 and slippage will occur at the gripper ring 44. When the supplemental piston 38 has reached its limit of movement and the brakes are then released, the spring 59 will retract the main piston 27 the pre-set distance, and adjustment will automatically be effected.

By virtue of the grooves 61, the pressure acting on the main piston 27 is effective through the entire area described by the anvil recess 26 despite the fact that there is an automatic retracting mechanism associated with the main piston 27. There is no loss of braking power for a given size of anvil recess.

The fluid displacement of the supplemental piston 38 is quite small. Assuming that there is no adjustment of the ratio between the pedal 37 and the master cylinder, the added displacement will still be unnoticed. The effective braking power is, however, increased by the action of the supplemental piston 38 because, to the yield limit of the friction connection, the force is transferred to the main piston.

Should the seal at the supplemental piston 38 become inoperative, the vent passage 41 is small enough to ensure differential resistance to flow of hydraulic fluid. If a chamber is provided instead of a vent, obviously there will be no loss of fluid. Hence, the main piston 27 can yet be operated. Also, if the entire retracting mechanism fails for any reason, there will be no failure of the main piston 27, which is a unit by itself.

Figure 4:
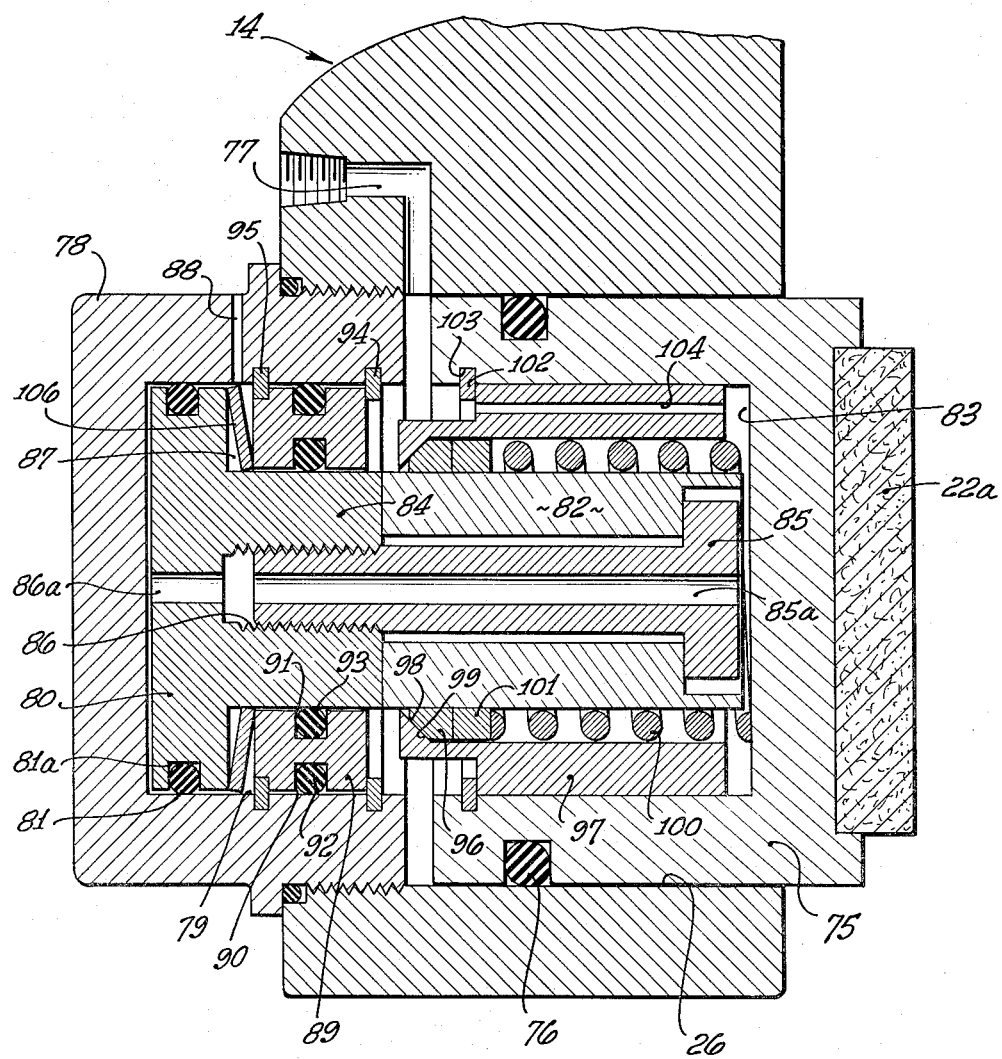
FIG. 4 is an enlarged view showing a modified cylinder structure.

In the form shown in FIG. 4, the same principle of operation as in FIG. 3 is achieved, but with a different organization of parts. In this modification, application of the brakes is effected by movement of a piston toward the right. As before, the anvil 14 supports a main piston 75, there being provided an O-ring 76 between the peripheral cylindrical wall of the piston 75 and the recess 26 of the anvil. Fluid is conducted to the anvil recess 26 to the left-hand side of the main piston 75 by the aid of a passage 77. A cap 78 closes the outer end of the anvil recess 26. The cap 78 provides, in this instance, an inwardly facing recess 79 in contrast to the outwardly facing recess 39 in the form illustrated in FIG. 3. Within this recess 79 a supplemental piston 80 is slidable. The piston 80 carries a sealing O-ring 81 in a peripheral groove 81a. The supplemental piston 80 carries a sleeve 82 that projects forwardly into a rearwardly facing recess 83 formed in the main piston 75. The sleeve 82 is clamped against the end surface of a reduced extension 84 of the supplemental piston 80 by the aid of a cap screw structure 85. The cap screw 85 passes through the sleeve 82 and it threadedly engages a central opening 86 formed in the supplemental piston extension 84.

Upon the application of fluid pressure, the supplemental piston 80 moves in a direction corresponding to application of the brakes. In the present instance, the pressure is conducted to the left-hand surface of the supplemental piston 80 via the recess 83 of the main piston 75. Fluid under pressure enters an axial passage 85a extending throughout the length of the bolt 85 and through an opening 86a in the bottom of the recess 86 formed in the supplemental piston.

In order to provide a net force for movement of the supplemental piston 80, the annular space 87 formed between the piston extension 84 and the walls of the cap recess 79 is exhausted to atmosphere. There is provided for this purpose a vent opening 88 extending transversely through the cap 78.

A sealing ring 89 is provided in order to prevent passage of fluid under pressure into the space 87 from the right. The ring 89 carries peripheral and interior annular grooves 90 and 91 respectively accommodating O-rings 92 and 93. These rings respectively seal against the cylindrical surface of the cap recess 79 and the peripheral cylindrical surface of the supplemental piston extension 84. The sealing ring 89 is retained in position by a pair of snap rings 94 and 95 at opposite ends, and respectively accommodated in internal grooves formed in the cap recess 79. Fluid pressure is thus ineffective to cause movement of the ring 89 that would otherwise offset the pressure motivating the supplemental piston 80.

In order to provide a yielding connection between the supplemental piston 80 and the main piston 75, a gripper ring 96 is provided. In the present instance, the gripper ring 96 is mounted on the main piston 75 rather than on the supplemental piston as in the previous form. In the present instance, the gripper ring 96 is constricted to engage the peripheral surface of the sleeve 82 of the supplemental piston 80. For this purpose, a retainer sleeve 97 is provided. The retainer sleeve 97 provides at its left-hand end an inwardly facing conical seat 98 that coacts with a similarly conical surface 99 of the gripper ring 96. A coil compression spring 100, seated in the bottom of the main piston recess 83 and acting through a pressure ring 101, urges the gripper ring 96 against the seat 98 and therefore into constricting relationship about the sleeve 82. The compression spring 100 is also effective to maintain the entire retainer sleeve at all times against a stop on the main piston 75. The stop is, in this instance, formed by a snap ring 102 seated in an internal groove 103 in the main piston recess 83.

One or more axial passages 104 in the spring retainer 97 ensures communication between the supply passage 77 and the right-hand end of the cap screw passage 85a as well as to the entire area of the main piston 75 and to the supplemental piston via the recess 83.

The limit of movement of the supplemental piston 80 is determined by a spring washer 106 which is accommodated in the exhaust space 87 associated with the supplemental piston 80. The spring washer 106 flattens against the seal ring 89 to determine this limit. When the fluid pressure is released, the supplemental piston 80 retracts to the left, carrying the main piston therewith by the aid of the gripper ring 96. The extent of retracting movement is determined by the normal configuration of the spring washer 106.

The operation of the structure illustrated in FIG. 4 is virtually the same as that described in connection with the previous form. There is no diminution whatsoever in the effective area of the main piston 75. Despite the existence of the retracting piston 80, the unit is entirely efficient.

In FIG. 5, there is illustrated a clutch unit embodying a cylinder structure similar to that illustrated in FIG. 3. The apparatus includes a driven clutch member 125 and a driving clutch member 126. The clutch members 125 and 126 are movable axially toward and away from each other. As the members are moved toward each other, friction material or brake band 127 carried by one of them is urged into engagement with the other of them and a driving connection is established.

The clutch member 125 is mounted upon an output or driven shaft 128. The other clutch member 126 is connected to an input or drive shaft 129. For this purpose, a yoke 200 is secured at its left-hand end to peripheral portions of the driving clutch member 126 by the aid of a plurality of splines 200a angularly spaced at the rear of the member 126. The yoke 200 has a hub portion 201 journalled upon the output shaft 128 by a suitable bearing. Secured respectively to the hub 201 and the drive shaft 129 are cooperating gear elements 202 and 203. The clutch member 126 is journalled upon the driven or output shaft 128. Roller bearing structures 204, the inner races of which can shift axially of the output shaft, are carried at the central opening of the clutch member 126.

A cup 205 located within the yoke 200 provides a piston space defined by a cylindrical inner wall 206. A main piston 207, substantially similar to the main piston 27 of the FIG. 3 form, is slidable in this cylinder space. The driving clutch member 126 is rigidly secured to the left-hand end of the main piston 207. Sealing O-rings 208 and 209, at external and internal grooves of the piston 207, establish a seal for the cylinder space at the output shaft 128 and at the cylindrical surface 206. A supplemental piston 210, equivalent to the supplemental piston 38, is also provided for achieving appropriate retracting or adjusting movement. The cylinder space for the supplemental piston 210 is provided by a cup 211 having its flange threadedly received in a threaded recess at the bottom of the cup 205 which forms the main cylinder chamber.

As in connection with FIG. 3, the supplemental piston 210 carries a head 210a, a gripper ring 212, a spring 213 and a pressure ring 214, all of which are accommodated in a rearwardly facing recess 215 provided by the main piston 207.

Pressure is conducted to the supplemental piston 210 at the bottom of the cup 205 and within the flange of the supplemental cup 211 by the aid of an axial passage 216 in the driven shaft 128. A branch port 216a intersects the axial passage 216 and is in constant communication with the bottom of the cup 205. Pressure is conducted to the main piston 207 via one or more ports 217 provided in the flange of the supplemental cup 211. These ports register with the inclined grooves 218 provided in the interior wall of the main piston 207.

The opposite side of the supplemental piston 210 is evacuated in a similar manner. Thus, a passage 219 extends axially in the opposite direction from the passage 216. Transverse passages 221 communicate with the axial passage 219. The passages 221 are in constant communication with an internal annular groove 222 formed in the stem portion between the head 210a and the supplemental piston 210. A series of apertures 223 establish communication between the internal annular groove 222 and the space to the left-hand portion of the supplemental piston 210. The remote end of the passage 219 opens to the atmosphere.

Since the passage 216 is located at the axis of the driven shaft 128, appropriate connection may be made to a source of pressure despite the rotation of the shaft 128.

In FIG. 6, there is illustrated a clutch or brake unit in which a plurality of cylinders 250 have axes extending in radial directions. All of the cylinder structures 250 are constructed as in FIG. 3, and are connected to a common boss 251 and to rotary apparatus. A relatively stationary brake band 252 is engaged by disk friction material 253 mounted on the cylinder structure 250. The especial advantage of the organization illustrated in FIG. 6 is that centrifugal force assists the action of the pistons in causing engagement between the material 253 and the brake drum 252. An exceptionally efficient structural arrangement is thus provided.

In FIG. 7, there is illustrated a double-acting cylinder 260 of the type shown in FIG. 3, actuating shoes 261 of a traditional automotive brake structure. The application of the cylinder unit is substantially universal to brakes and clutches.

The inventor claims:
1. An actuating structure for cooperation with a cylinder space: a main piston adapted to be guidingly accommodated in said cylinder space; means for applying fluid under pressure to the entire area of said main piston for moving said main piston in one direction; a supplemental piston; means forming a supplemental cylinder space for the supplemental piston; the main piston having an interior substantially cylindrical surface exposed in said cylinder space; means maintaining fluid communication on opposite sides of said cylindrical surface for conduction of fluid pressure to all operative areas of said main piston; the supplemental piston having a part projecting beyond its cylinder space and accessible adjacent said cylindrical surface; gripper means mounted on said part, and urged frictionally between said part and said cylindrical surface to provide a yielding friction coupling between the pistons; means determining opposite limits of movement of the supplemental piston; means for applying fluid pressure to the supplemental piston simultaneously with the application of fluid pressure to the main piston for movement of the supplemental piston to one limit; and a spring for moving the supplemental piston to the other limit upon release of fluid pressure.

2. The combination as set forth in claim 1, in which said part has a frusto conical head, the gripper means being a peripherally expansible ring and engaging the frusto conical head, there being resilient means mounted on the said part urging the gripper ring axially and thus outwardly of the head and into engagement with said cylindrical surface.

3. The combination as set forth in claim 2 in which said frusto conical head is so arranged that relative advancement of the supplemental piston tends to unseat the gripper ring, whereas relative retraction thereof tends to seat the gripper ring.

4. The combination as set forth in claim 2 in which said resilient means comprises a spring washer that provides a substantially constant force on said gripper ring despite variations in the axial position of said gripper ring.

5. An actuating structure for cooperation with a cylinder space: a main piston adapted to be guidingly accommodated in said cylinder space; means for applying fluid under pressure to the entire area of said main piston for moving said main piston in one direction; a supplemental piston; means forming a supplemental cylinder space for the supplemental piston; the supplemental piston having a part projecting beyond its cylinder space; said part having a substantially cylindrical peripheral surface exposed in said cylinder space; means maintaining fluid communication on opposite sides of said cylindrical surface for conduction of fluid pressure to all operative areas of said main piston; gripper means mounted on said main piston, and urged frictionally between said main piston and said cylindrical surface to provide a yielding friction coupling between the pistons; means determining opposite limits of movement of the supplemental piston; means for applying fluid pressure to the supplemental piston simultaneously with the application of fluid pressure to the main piston for movement of the supplemental piston to one limit; and a spring for moving the supplemental piston to the other limit upon release of fluid pressure.

6. The combination as set forth in claim 5 in which said main piston has a portion provided with an internal frusto conical surface, the gripper means being a peripherally contractable ring and engaging said surface, there being resilient means mounted on said main piston urging the gripper ring axially of said frusto conical surface and thus inwardly thereof into engagement with said cylindrical surface.

7. The combination as set forth in claim 6 in which said frusto conical surface is so arranged that relative advancement of the supplemental piston tends to unseat the gripper ring whereas relative retraction thereof tends to seat the gripper ring.

References Cited in the file of this patent

UNITED STATES PATENTS

| | | |
|---|---|---|
| 1,869,085 | Wiliamson | July 26, 1932 |
| 2,672,220 | Collier | Mar. 16, 1954 |
| 2,746,254 | Lucien | May 22, 1956 |
| 2,801,712 | Lockhart | Aug. 6, 1957 |
| 2,803,314 | Halibrand | Aug. 20, 1957 |
| 2,817,419 | Wolf | Dec. 24, 1957 |
| 2,835,111 | Oswalt | May 20, 1958 |
| 2,888,109 | Tankersley | May 26, 1959 |